United States Patent [19]

Lee et al.

[11] Patent Number: 4,840,808

[45] Date of Patent: Jun. 20, 1989

[54] METHOD OF PRESERVING COLOR OF VEGETABLE PASTA PRODUCTS

[75] Inventors: Yanien Lee, Manlius; Carleton G. Merritt, Phoenix; Nancy E. Dermody, Camillus, all of N.Y.

[73] Assignee: Borden, Inc., Columbus, Ohio

[21] Appl. No.: 99,923

[22] Filed: Sep. 23, 1987

[51] Int. Cl.$^4$ .............................................. A23L 1/16
[52] U.S. Cl. ................................. 426/270; 126/557
[58] Field of Search ............... 426/451, 516, 270, 557, 426/262, 267, 269, 615, 540

[56] References Cited

U.S. PATENT DOCUMENTS

| | | |
|---|---|---|
| 2,189,774 | 2/1940 | Blair . |
| 2,305,643 | 12/1942 | Stevenson et al. . |
| 2,589,037 | 3/1952 | Bendix et al. . |
| 3,762,931 | 10/1973 | Craig et al. . |
| 3,787,591 | 1/1974 | Hagiwara ............................ 426/557 |
| 4,473,591 | 9/1984 | Segner et al. . |
| 4,478,860 | 10/1984 | Hekal et al. . |
| 4,517,215 | 5/1985 | Hsu ..................................... 426/451 |
| 4,675,199 | 6/1987 | Hsu ..................................... 426/516 |

FOREIGN PATENT DOCUMENTS

| | | |
|---|---|---|
| 58033 | 9/1983 | Japan . |
| 164447 | 9/1984 | Japan . |
| 164447 | 8/1985 | Japan ................................ 426/557 |
| 135558 | 6/1986 | Japan ................................ 426/270 |
| 107759 | 5/1987 | Japan ................................ 426/270 |

OTHER PUBLICATIONS

Lee 1975 Basic Food Chemistry AVI Publishing Co. Westport CT pp. 3, 163-165.
Francis 1975 Food Colorimetry AVI Pulishing Co. Westport CT pp. 214-216.
Jarrett 1969 The Complete Book of Pasta Dover Publications NY, pp. 28-31.
Duxbury Food Processing, USA 48(13) 104, 109 (abstract).
Cirilli 1975 Lab. Chem. Anal. Appl. Tecnica Molitoria 1975 26(7) 98-101 (abstract).
Gupte, et al., "Food Technology" Oct. 1964.

*Primary Examiner*—Donald E. Czaja
*Assistant Examiner*—Carolyn Paden
*Attorney, Agent, or Firm*—Dennis H. Rainear; George P. Maskas; Kenneth P. Van Wyck

[57] ABSTRACT

The invention relates to a process for preserving the color and texture of vegetable pasta, wherein the color of the vegetable pasta is derived from chlorophyll-containing vegetable matter added to alimentary paste at a pH above 7.0. The color preservation is enhanced by the presence or addition of a cation selected from the group consisting of magnesium, zinc, copper, calcium, and aluminum cations.

21 Claims, No Drawings

METHOD OF PRESERVING COLOR OF VEGETABLE PASTA PRODUCTS

BACKGROUND OF THE INVENTION

This invention is directed to a method for preserving the color and texture of vegetable pasta produced from alimentary pastes.

The terms "alimentary pastes" and "pastes", as used herein, refer to the flour and water mixtures which when cooked are commonly known as pasta, such as spaghetti, macaroni, noodles, ziti, etc. Alimentary pastes are generally made from coarse, hard flours obtained from hard wheat such as the middlings of durum wheat, often referred to as "semolina flour" or "semolina". Semolina comprises a major portion of the flour in alimentary pastes because it is highly glutinous and provides a self-supporting pasta. Shaped products made therefrom will substantially maintain their original form after subsequent processing, such as cooking. The term "cooking", as used herein, refers to the process of gelatinizing the starch and denaturing the protein to form a firm, rigid matrix within the alimentary paste, which occurs upon heating the alimentary paste. The term "alimentary vegetable paste" as used herein refers to alimentary pastes as defined above wherein ground, shredded, chopped or whole vegetable is included. The vegetables whose color is preserved by the method of the present invention include chlorophyll-containing vegetables such as spinach, celery, parsley, peas, and the like.

Pastas are commercially available in many forms including cooked, partially cooked and uncooked forms. "Cooked pasta" is defined herein to mean pasta wherein substantially all of the starch is gelatinized. "Uncooked pasta" is defined herein to mean pasta wherein a major portion of the starch is ungelatinized, i.e., greater than about 80% by weight of the total starch content is ungelatinized. The term "uncooked pasta" includes pasta wherein none of the starch is gelatinized. Starch gelatinization is generally accompanied by protein denaturation. Although protein denaturation is of greater concern, starch gelatinization can be quantified with greater accuracy and is therefore used herein to define cooked and uncooked pasta.

There are advantages to each of these types of pasta products; however, the most common form of pasta purchased retail is dry and uncooked pasta. This form is the most versatile because the product may be stored at room temperature for long periods of time. In addition, pasta in this form maintains its highly glutinous properties in that a substantial portion of protein is undenatured, providing a firm pasta upon cooking. Partially cooked and cooked pastas provide the advantage of rapid preparation but often require special packaging, exhibit reduced firmness and product quality, and often have a shorter shelf life than uncooked pasta.

Processes for the commercial manufacture of dry, uncooked pasta are well known. In these processes, water and semolina flour are mixed within an extruder to provide the alimentary paste. This paste is forced through holes in the extruder die at a high pressure and at an elevated temperature, to obtain the desired cross-sectional shape. The extrudate is often cut to desired lengths. In a conventional pasta extrusion process, the alimentary paste exhibits a moisture level of about 30 weight percent and is maintained at a temperature of about 120° F. (49° C.).

Drying is a time consuming step in the preparation of uncooked pastas. The extrudate generally has a moisture level of about 28 weight percent or above which must be reduced to a value of about 12%–14% to permit storage of the product at ambient conditions. The drying step, or steps, may require from about 18 to 36 hours.

The addition of flavoring and/or coloring agents to pasta has in the past resulted in a pasta product with a starchy, gummy texture and which does not retain its color on shelf aging or when cooked in water. A method of preserving a color in alimentary pasta is therefore desirable.

While cations and/or high pH have been used to stabilize chlorophyll (the coloring agent in green vegetables) in canned or frozen vegetables, the use of high pH, with and without supplemental cations, in color and texture preservation in vegetable pasta is unknown.

Traditionally, the pasta industry manufactures vegetable pasta, such as spinach pasta products, from semolina and spinach powder. Spinach pasta, for example, prepared in this manner possesses a yellow-green to yellow-brown color.

Segner, et al., U.S. Pat. No. 4,473,591 issued Sept. 25, 1984, discloses a process for retaining the natural green color of canned or frozen vegetables. The green vegetables, such as spinach, are subjected to a blanching operation at 150°–212° F. in an aqueous solution which contains 50–500 ppm of zinc or copper ions. Once the vegetables in Segner, et al. are blanched, the vegetables are packed in a container or frozen.

Malecki, U.S. Pat. No. 2,906,628 issued Sep. 29, 1959, discloses a method of preserving the green color of vegetables. In this patent, the green color of the vegetable is preserved if immediately before or immediately after blanching, the vegetables, specifically peas, are briefly dipped in an alkaline solution, such as sodium hydroxide. It is noted that the change of color in the peas is reduced if the canning solution is maintained at a pH in the order of 8–8.5. Further, the inventor therein notes that in his co-pending application, the peas are first blanched by soaking them in a hot water bath containing magnesium hydroxide for two to five minutes. The cans are then filled with the peas and an aqueous canning solution which contains disodium glutamate and sodium hydroxide to bring the pH of the solution after processing to 8.5.

Hekal, et al., U.S. Pat. No. 4,478,860 issued Oct. 23, 1984, discloses a process for improving the organoleptic properties of canned green vegetables. Vegetables are first blanched in an alkaline solution having a pH of at least 11. The blanched vegetables are suspended in a brine having an alkalinity of between 25 and 75 milliequivalents of hydroxyl ion.

Gupte, et al., Food Technology, October 1964, discloses a method to retain more chlorophyll and, therefore, more color in spinach puree. Spinach puree was adjusted to pH 8.5 with magnesium carbonate and processed at 300° F. The spinach puree retained approximately 25% of the chlorophyll after six months at room temperature.

Japanese patent No. 60-58033 published September 9, 1983, discloses a process for preparing dried vegetables. Vegetables such as spinach are blanched in an aqueous solution of pH 7–10 containing magnesium ions, and are then dried.

Japanese patent No. 60-164447 published June 2, 1984, discloses spinach-containing noodles. The noodles are prepared by adding liquid-state spinach containing sodium chloride to flour and eggs.

Regarding the art of preserving green color in canned foodstuffs, see also U.S. Pat. No. 2,305,643, issued Dec. 22, 1942 to Stevenson, et al; U.S. Pat. No. 2,189,774, issued Feb. 13, 1940 to Blair; and U.S. Pat. No. 2,589,037 issued Mar. 11, 1952 to Bendix, et al.

SUMMARY OF THE INVENTION

Freshly harvested green vegetable color can be preserved and retained in finished pasta and macaroni products produced by the addition to semolina at a high pH of sufficient amounts of cations, alkaline and buffering substances in vegetable puree or reconsitituted vegetable powder slurry.

DETAILED DESCRIPTION OF THE INVENTION

Semolina usually contains about 1.6 to 2.2% phosphoric acid and has a pH of about 5.5. As a result of this, alkaline and buffering substances must be present in vegetable puree or reconstituted vegetable powder slurry used in making vegetable pasta at levels sufficient to neutralize the acidity of the semolina and maintain dough and finished pasta products above pH 7.0. Furthermore, if sufficient acid neutralizer is added totally as sodium or potassium hydroxide, for example, the pH of the vegetable slurry will be greater than 11.0 causing undesirably soft sticky pasta.

If the natural sodium or potassium content of the green vegetable matter is equal to or greater than 100mg of sodium or potassium per 100gm of dry vegetable matter, no additional sodium or potassium ion need be added to the process of the present invention to achieve color retention. If the natural sodium or potassium ion content is below 100mg/100gm dry vegetable solids, then sodium or potassium ion can be added. The presence of sodium or potassium ion is advantageous because it produces darker green soluble salts such as chlorophyllins. It has been discovered that pasta retaining the dark green vegetable coloration can be produced by the presence and/or addition of sodium, potassium or magnesium ions. The alkaline sodium- or potassium-containing solution is used in the present invention to inhibit enzymes such as peroxidase, polyphenoloxidase and catalase, which can cause loss of color. Therefore, according to the method of the present invention, a basic metallic salt with buffering capacity and limited ionization, such as magnesium oxide, magnesium carbonate, aluminum hydroxide, zinc sulfate, disodium phosphate or calcium oxide, can be added to the alkaline solution. A more preferred embodiment of the present invention is the introduction of a magnesium compound.

According to the present invention, green vegetable matter is subjected by a dip or spray operation to an alkaline sodium or potassium containing solution wherein the pH is above 7.0. The color of the green vegetable matter is attributed to the presence of chlorophylls. The methyl and phytyl groups in the chlorophylls can be hydrolyzed and replaced by sodium or potassium atoms in an alkaline solution to form water soluble salts called chlorophyllins, such as, for example, sodium magnesium chlorophyllin ($C_{34}H_{31}N_4Na_3MgO_6$) The hydrolysis of the methyl and phytyl groups to produce the chlorophyllins requires a pH of 7.0 or above. Chlorophyllins typically possess a deep green color. The chlorophyllins produced from the hydrolysis of the methyl and phytyl groups of chlorophyll are, according to the present invention, added to alimentary paste to produce darkly colored pasta. However, the pH of the pasta must be maintained above 7.0. A preferred pH of the pasta is 7.0 to 10.0 and a more preferred pH is 7.0 to 8.0. The water soluble chlorophyllins added to the alimentary vegetable paste contribute to the stable green coloration of the alimentary vegetable paste and pasta produced therefrom.

If the chlorophylls are present in the vegetable matter, a puree, or reconstituted slurry of vegetable matter in a protonated or acid condition, that is, a pH below 7.0, the excess hydrogen ion present in the system will replace the magnesium in the chlorophylls. This ion replacement degrades the chlorophylls, generally producing pheophytin, which exhibits an undesirable nongreen color. Thus, the preferred pH of the vegetable slurry is above 7.0 and more preferably between 8.0 and 11.0.

Therefore the present invention relates to a method of preserving the color and texture of fresh green vegetable pasta comprising: (a) subjecting fresh green vegetable matter to an alkaline sodium or potassium containing solution for a period of time sufficient to hydrolyze or partially hydrolyze the chlorophyll contained in the green vegetable matter, whereby the methyl and phytyl ester groups of the chlorophyll are replaced with sodium or potassium atoms, wherein the pH of the sodium or potassium containing solution is maintained above 7.0 by addition of a buffer, if needed;

(b) preparing a puree of the hydrolyzed vegetable matter wherein the pH is maintained above 7.0;

(c) feeding and blending a feedstock comprised of glutinous flour, the puree of hydrolyzed vegetable matter, and water, to form an alimentary vegetable paste, wherein the pH of said alimentary vegetable paste is above 7.0 and below 10.0;

(d) extruding by internal pressure said alimentary vegetable paste through holes in an extruder die having a plurality of holes, or by sheeting said vegetable paste by pressing it between rollers; and (e) drying the extruded or sheeted alimentary vegetable paste to produce vegetable pasta.

In performing the process of this invention, a feedstock comprised of glutinous flour and water can be utilized. The term "glutinous flour" as used herein is intended to include and describe flours which provide a self-supporting paste when mixed with water. Such a self-supporting paste, once shaped, will substantially retain its original form, texture and color at ambient conditions or after subsequent processing, such as drying or cooking. Semolina flour, also referred to as "semolina" herein, is a common, hard, coarse, wheat flour obtained from durum wheat. There are different grades of semolina having different glutinous properties. Both high grade and low grade semolina are intended to be included in the glutinous flours suitable for this invention. Other coarse, glutinous flours, obtained from more uncommon grains may be used in place of semolina and are intended to be included within the scope of the term "glutinous flour". In addition, fine flours such as durum flour, wherein 98 weight percent passes through a 70 mesh sieve, are also suitable and are intended to fall within the scope of the term "glutinous flour" used herein. These fine flours may be preferred where it is difficult to obtain adequate blending with water from the equipment utilized. The only requirement for the flour is that it provide a self supporting paste upon admixture with water. The glutinous flour preferably comprises at least 75% by weight of the dry ingredients. Preferred glutinous flours are semolina and durum flour. Non-glutinous flours, which do not provide a self-supporting paste upon admixture with water, such as rice, may be added to the feedstock although they do not fall within the scope of the term "glutinous flour" as used herein. Other additives, including seasonings, vitamins, dyes, egg, flavorings, such as cheese, beef and chicken, and vegetable solids may be added for flavor, color, nutrition or other additive effect.

The term "water", as used herein, refers to substantially pure forms of water, such as distilled water, well water, spring water and the like, and those liquids wherein water is a major component such as milk, broths, juices and the like. Furthermore, the term "water", as used herein, includes water in all physical states, such as steam, ice and liquid.

Special mention is made of the additives salt, disodium phosphate and glyceryl monostearate. These are ingredients commonly found in commercial pastas. Salt provides flavor while glyceryl monostearate functions as an emulsifier or lubricant, i.e., flow modifier, which reduces the viscosity of the alimentary paste, making extrusion easier. The use of glyceryl monostearate in the methods of the present invention will reduce the pressure within the extruder. The glyceryl monostearate and disodium phosphate can be added according to the present invention in a quantity sufficient to reduce the viscosity of the finished product to the desired level. Also suitable are the flow modifiers or "modifying agents" disclosed by Craig, et al., in U.S. Pat. No. 3,762,931, i.e. whey solids in conjunction with sulfhydryl reducing substances, such as L-cysteine, glutathione and sulfite salts (sodium bisulfite and calcium sulfite). The description of these "modifying agents" at column 6, line 57, to column 8, line 43, of Craig, et al., is incorporated herein by reference. The addition of flow modifiers or "modifying agents" is not essential to the performance of this invention.

The components of the feedstock, including flour, water, additives, vegetable puree or reconstituted vegetable powder, may be separately introduced to the extruder or they may be premixed to form a preliminary paste. Commercial equipment is available for handling both types of feedstocks. To ensure a uniform product, however, separate metering of the feedstock components is often preferred.

The term "extruder", as used herein, refers to those devices which generally comprise a threaded screw positioned within a barrel having a means for receiving components to be mixed, such as a feed hopper positioned at one end, a means for discharging mixed components at the opposing end of the device, and a means for rotating the screw within the barrel. An example of a discharging means is a die having holes for the passage of the mixed materials, positioned at the end of the screw. Conventional extruders utilized in the preparation of alimentary pastes or plastics are well suited for this invention. These include both single screw and twin screw extruders. Examples of suitable extruders include those marketed by Brabender, Mapimpianti (GF 20 series), Buhler, DeMaco and Braibanti.

The alimentary vegetable paste is forced through the holes of the extruder die or pressed between rollers to obtain the desired shape. The holes in the extruder die or spacing between the rollers prescribe the profile of the alimentary vegetable paste. The alimentary vegetable paste passes through the die or between the rollers due to internal pressures generated by, for example, a rotating screw or screws. The extruded alimentary vegetable paste may be cut to desired lengths to provide a product in substantially final form. Cutting generally occurs at the extruder die and may be carried out in a conventional manner. Cutting is not essential to the practice of this invention since the alimentary vegetable paste may be formed into desired lengths by pulling the extrudate away from the die. All conventional pasta shapes are obtainable by this invention.

According to the method of the present invention, green vegetable matter is placed in a kettle, optionally shredded, and immediately heated to 200°-205° F. The green vegetable matter can include, for example, spinach, celery, parsley, peas or combinations thereof. The invention, however, is not limited to these vegetables and can include any chlorophyll-containing vegetation. A sodium or potassium containing solution is added when the temperature of the vegetable matter reaches about 150° F. The preferred pH of the sodium or potassium containing solution used to the chlorophyll is above 7.0 and a more preferred range is 8.0 to 11.0. The pH must be maintained in this range to facilitate the hydrolysis and also to aid the subsequent neutralization of the acidic semolina. The vegetable matter can be cooked at 200° F. and finely chopped or blended to produce a vegetable puree. The vegetable puree thus produced is then heat concentrated to, for example, 10% solids for later use in the vegetable pasta manufacturing.

Certain food grade metallic salts (sources of cations) can be added to the sodium or potassium containing solution. These metallic salts can include compounds or salts of magnesium, aluminum, zinc, sodium, copper and calcium. The concentrations of the cations derived from the food grade metallic salts and added by the method of the present invention, range from 50 parts per million to 10,000 parts per million, based on the fresh weight of the green vegetable matter. The vegetable matter generally contains about 8% total solids. Therefore, the cations added are equivalent to 0.0625% to 12.5% of vegetable solids. The presence of the cations from the salt or salts enhances the color and texture retention.

The pH of the alkaline solution to which the green vegetable matter is subjected must be maintained above 7.0 and preferably between 8.0 and 11.0. This is achieved by the addition, as needed, of buffers such as, for example, sodium hydroxide, sodium phosphate, sodium carbonate, disodium phosphate, trisodium phosphate, sodium lactate, sodium bicarbonate, magnesium carbonate, potassium phosphate, potassium carbonate, or potassium lactate. The invention is not limited to the use of these buffers but can include the use of any buffer material well known to those skilled in the art of pH stabilization.

According to the method of the present invention, the vegetable matter can be sprayed with or dipped into an alkaline metallic salt solution prior to the shredding and heating step described above. Such a treatment will also result in the color and texture preservation in the resultant vegetable pasta. A preferred cation for the preservation of vegetable pasta color and texture according to the method of the present invention is magnesium.

During vegetable pasta production, the concentrated cation-containing vegetable puree can be added to semolina and the mixture blended to produce an alimentary vegetable paste. In a preferred embodiment of the present invention, the vegetable solids constitute approximately 3% of the finished pasta products. The mixed alimentary vegetable paste, at about 30% moisture, can be extruded conventionally, in a pasta extruder or press and formed into various shapes, for example, spaghetti, elbow, spiral, shell, etc. The extruded pasta is then subjected to a drying process to reduce the moisture content for a shelf stable product. The invention, however, is not limited to pasta produced by an extrusion process.

It should be noted that when the pH of the puree is less than 7.0, the resulting pasta color is yellow to yellow-green (pasta color evaluation of 2 to 5). It should also be noted that, in general, the color retention of the pasta improves with increasing pH of the vegetable puree in the presence of a cation.

Vegetable pasta can also be produced by adding vegetable powder and water to glutinous flour. Thus, the present invention also relates to a method of preserving the color and texture of vegetable pasta comprising:

(a) drying and milling green vegetable matter to produce a vegetable powder;
(b) subjecting the vegetable powder to a sodium or potassium containing solution for a period of time sufficient to hydrolyze or partially hydrolyze the chlorophyll contained in the green vegetable matter, whereby the methyl and phytyl ester groups of the chlorophyll are replaced with sodium or potassium atoms in an amount sufficient to secure color and texture retention, wherein the pH of the sodium or potassium containing solution is maintained above 7.0 by the addition of a buffer, if necessary;
(c) reconstituting the vegetable powder by blending with a feedstock comprised of glutinous flour and water, to form an alimentary vegetable paste; and
(d) drying the alimentary vegetable paste to produce vegetable pasta.

In typical commercial spinach powder production, fresh harvested spinach is cleaned, washed and cut into large flakes, the stems are separated and sifted out by an air stream; the leaves washed, drained again; recombined; and conveyed to a zone dryer. At this stage, by the present invention, a spray of or dip into an alkaline metallic salt solution can be incorporated prior to the spinach entering the dryer if the fresh harvested spinach green color is to be preserved.

During pasta extrusion, the spinach powder is, according to the present invention, reconstituted with appropriate amount of water, metallic salts, alkaline and buffering substances. Representative examples of reconstituted spinach slurry with various cations added are shown in Table II of Examples 9-13. Thus, in one embodiment of the present invention, the reconstituted spinach slurry constitute 12% solids and 88% water.

The semolina is mixed with extruding and processing aides (GMS or DSP), if used, and with the reconstituted cation-containing spinach slurry, which should contribute 3% of the finished pasta weight. The mixed alimentary spinach paste containing approximately 30% moisture, is extruded and dried. The spinach pasta produced by the methods of this invention retains desirable spinach color and desirable pasta texture, i.e., the pasta remains firm and is not gummy or starchy. The dried, uncooked spinach pasta product by the methods of the present invention also has good shelf stability.

The following Examples are provided to further illustrate, but in no way limit, the invention. It is contemplated that modifications will readily occur to those skilled in the art, within the spirit of the invention and the scope of the appended claims.

EXPERIMENTAL

Examples 1-8

Addition of Metallic Salts and an Alkaline Solution to Fresh Spinach Puree

Approximately 19.5 pounds of fresh, washed, drained spinach were placed in a swept surface kettle, shredded and immediately heated to 200°-205° F. An alkaline solution containing salts as specified in Table I was added to the spinach when the temperature of the spinach reached 150° F. The heat treated spinach was pureed in a Waring blender at 1000 rpm for 5 minutes and then heat concentrated to 10% solids. To the concentrated spinach puree was added a buffer, such as sodium hydroxide (NaOH) and/or disodium phosphate ($Na_2HPO_4$) as needed to raise the pH (see Table 1). Semolina was added to the puree in a Hobart dough mixer until all ingredients were uniformly mixed. The mixed spinach paste was extruded in a pasta extruder, cut, dried and cooked. The precooked and cooked spinach pasta retained a green color similar to that of fresh spinach. A firm and non-gummy texture was also retained in the pasta produced by this method.

Extruded and dried spinach pasta products prepared by the method of the present invention were cooked and evaluated for their visual color appearance on a rating scale of 0 to 10; a rating of 0 was assigned to yellow-brown colored spinach pasta, and a score of 10 was assigned to a color similar to fresh spinach. A rating of 1 though 9 represents increasing increments in the intensity of the green color of the spinach pasta products and a decrease in the intensity of brown color. Color ratings (subjective visual interpretation) of the spinach pasta products produced from spinach puree with and without metallic salts added are shown in Table I.

TABLE I

METAL SALTS ADDED DURING PREPARATION OF SPINACH PUREE.

| EXAMPLE NO. | METALLIC SALTS | | PUREE pH | PASTA pH | PASTA COLOR |
|---|---|---|---|---|---|
| 1. | None | | 6.6 | 6.1 | 2 |
| 2. | $MgCO_3$ | 10.0% | 8.78 | 7.2 | 8 |
| 3. | MgO | 1.2% | 8.82 | 6.8 | 6 |
| 4 | MgO | 1.2% | 9.76 | 7.4 | 8 |
|  | NaOH | 2.1% | | | |
| 5. | MgO | 10.0% | 10.66 | 8.5 | 9 |
| 6. | $Al(OH)_3$ | 4.0% | 11.0 | 7.9 | 8 |
|  | NaOH | 5.0% | | | |
| 7. | CuCO | 4.2% | 8.7 | 7.2 | 8 |
|  | $Na_2HPO_4$ | 33.0% | | | |
|  | NaOH | 1.5% | | | |
| 8. | CaO | 4.5% | 9.1 | 7.3 | 9 |
|  | $Na_2HPO_4$ | 33.0% | | | |

Note: The percentages of metallic salts and alkaline substance added were calculated on dried spinach solids basis.

Examples 9–33

Spinach Pasta Made From Metallic Salt Solution and Reconstituted Spinach Powder In the following Example shown in Table II, fresh spinach was cleaned, washed, cut and dried to form spinach powder. Alimentary paste was prepared from semolina and the spinach powder added in a Hobart mixer to the alimentary paste along with a cation containing solution as shown in Table II.

Example 34

Celery Pasta

Using the procedure of Examples 9–33, celery pasta was produced from reconstituted celery powder by substituting cleaned, washed celery for the spinach. Water was added to the celery powder to produce a celery slurry which was added to semolina to produce an alimentary celery paste. Pasta was extruded and evaluated for color and texture. See Table III. Acceptable celery pasta was produced from celery slurry exhibiting a pH above 7.0.

TABLE II
METALLIC SALTS ADDED TO SLURRY PREPARED FROM RECONSTITUTED SPINACH POWDER.

| EXAMPLE NO. | METALLIC SALTS | | PUREE pH | PASTA pH | PASTA COLOR | TEXTURE |
|---|---|---|---|---|---|---|
| 9. | None | | 6.9 | 5.9 | 2 | (+) |
| 10. | MgO | 20.0% | 9.7 | 9.4 | 9 | (−) |
| 11. | MgO | 2.0% | 10.8 | 8.7 | 10 | (−) |
| | NaOH | 4.0% | | | | |
| 12. | MgO | 2.0% | 10.4 | 7.5 | 10 | (+) |
| | NaOH | 2.0% | | | | |
| 13. | MgO | 2.0% | 9.8 | 7.3 | 9 | (+) |
| | NaOH | 1.0% | | | | |
| 14. | MgO | 10.0% | 10.5 | 9.1 | 10 | (−) |
| | NaOH | 1.0% | | | | |
| 15. | $MgCl_2.6H_2O$ | 5.0% | 9.2 | 6.0 | 4 | (+) |
| | NaOH | 2.0% | | | | |
| 16. | $MgCl_2.6H_2O$ | 1.0% | 9.5 | 6.2 | 4 | (+) |
| | NaOH | 2.0% | | | | |
| 17. | $MgCl_2.6H_2O$ | 1.0% | 11.1 | 6.4 | 4 | (+) |
| | NaOH | 4.0% | | | | |
| 18. | $MgCl_2.6H_2O$ | 1.0% | 11.4 | 6.8 | 7 | (+) |
| | NaOH | 5.0% | | | | |
| 19. | $MgCl_2.6H_2O$ | 1.0% | 12.5 | 7.3 | 9 | (+) |
| | NaOH | 6.0% | | | | |
| 20. | $MgCl_2.6H_2O$ | 1.0% | 12.7 | 7.6 | 10 | (+) |
| | NaOH | 7.0% | | | | |
| 21. | MgO | 3.0% | 10.3 | 7.6 | 10 | (+) |
| | NaOH | 1.0% | | | | |
| 22. | MgO | 3.0% | 9.9 | 7.3 | 9 | (+) |
| | $Na_2HPO_4$ | 34.0% | | | | |
| 23. | CaO | 4.5% | 9.1 | 7.3 | 9 | (+) |
| | $Na_2HPO_4$ | 33.0% | | | | |
| 24. | CaO | 4.5% | 10.3 | 7.4 | 9 | (+) |
| | $Na_2HPO_4$ | 33.0% | | | | |
| | NaOH | 1.0% | | | | |
| 25. | $Al(OH)_3$ | 4.0% | 7.9 | 6.3 | 4 | (+) |
| | NaOH | 1.0% | | | | |
| 26. | $Al(OH)_3$ | 4.0% | 11.1 | 6.5 | 5 | (+) |
| | NaOH | 3.0% | | | | |
| 27. | $Al(OH)_3$ | 4.0% | 12.1 | 7.7 | 9 | (+) |
| | NaOH | 5.0% | | | | |
| 28. | $Na_2HPO_4$ | 33.0% | 11.0 | 7.4 | 9 | (+) |
| | NaOH | 5.0% | | | | |
| 29. | $Na_2HPO_4$ | 33.0% | 12.1 | 7.7 | 9 | (+) |
| | NaOH | 6.0% | | | | |
| 30. | $ZnSO_4$ | 2.0% | 8.8 | 7.1 | 8 | (+) |
| | NaOH | 2.7% | | | | |
| | $Na_2HPO_4$ | 33.0% | | | | |
| 31. | $ZnSO_4$ | 2.0% | 10.4 | 7.5 | 9 | (+) |
| | NaOH | 5.0% | | | | |
| | $Na_2HPO_4$ | 33.0% | | | | |
| 32. | CaO | 10.0% | 12.1 | 9.2 | 9 | (−) |
| 33. | CaO | 20.0% | 12.6 | 10.0 | 9 | (−) |

Note:
[1]Under "Texture" above:
(+) = Acceptable texture;
(−) = Unacceptable texture.
[2]The percentage of metallic salts and alkaline substances were calculated on dried spinach solids basis.
[3]Disodium phosphate was added at 33% spinach solids level, when spinach slurry was added to semolina, spinach solids would constitute 3% and disodium phosphate would constitute 1%.

TABLE III

METAL SALTS ADDED DURING PREPARATION OF CELERY SLURRY.

| EXAMPLE NO. | METALLIC SALTS | | SLURRY pH | PASTA pH | PASTA COLOR | TEXTURE |
|---|---|---|---|---|---|---|
| 34. | MgO | 1.35% | 11.3 | 7.8 | 7 | (+) |
|  | NaOH | 3.25% |  |  |  |  |
|  | Na$_2$HPO$_4$ | 33.0% |  |  |  |  |

Example 35

Parsley Pasta

Using the procedure of Examples 9–33, parsley pasta was produced from reconstituted parsley powder by substituting cleaned, washed parsley for the spinach. Water was added to the parsley powder to produce a parsley slurry which was added to semolina to produce an alimentary parsley paste. Pasta was extruded and evaluated for color and texture. See Table IV. Acceptable parsley pasta was produced from parsley slurry exhibiting a pH above 7.0.

TABLE IV

METAL SALTS ADDED DURING PREPARATION OF PARSLEY SLURRY.

| EXAMPLE NO. | METALLIC SALTS | | SLURRY pH | PASTA pH | PASTA COLOR | TEXTURE |
|---|---|---|---|---|---|---|
| 35. | MgO | 1.35% | 10.4 | 7.4 | 9 | (+) |
|  | NaOH | 3.25% |  |  |  |  |
|  | Na$_2$HPO$_4$ | 33.00% |  |  |  |  |

That which is claimed is:

1. A method of preserving the color and texture of fresh green vegetable pasta comprising:
   (a) subjecting fresh green vegetable matter to an aqueous alkaline solution for a period of time and at a temperature sufficient to hydrolyze or partially hydrolyze the methyl and phytyl ester groups of the chlorophyll contained in the green vegetable matter, whereby the methyl and phytyl ester groups of the chlorophyll are converted to the respective alkali salts, wherein the pH of the alkaline solution is maintained between 9.0 and 11.0 by addition of sufficient buffer and wherein the buffer comprises a cation selected from the group consisting of calcuim, sodium, potassium, magnesium, zinc, copper and aluminum;
   (b) preparing a puree of the hydrolyzed vegetable matter of step (a) wherein the pH is maintained between 9.0 and 11.0;
   (c) blending a mixture comprised of glutinous flour, the puree of hydrolyzed vegetable matter of step (b), and water, to form a green alimentary vegetable paste, wherein the pH of said alimentary vegetable paste is above 7.0 and below 9.0;
   (d) extruding by internal pressure said green alimentary vegetable paste through holes in an extruder die having a plurality of holes, or by sheeting said green alimentary vegetable paste by pressing it between rollers; and
   (e) drying extruded or sheeted green alimentary vegetable paste to produce vegetable paste which retains the green color of the vegetable matter.

2. A method as claimed in claim 1 wherein the pH of the solution is between 9 and 11.

3. A method as claimed in claim 1 wherein the buffer in the alkaline solution is selected from the group consisting of sodium hydroxide, sodium carbonate, disodium phosphate, trisodium phosphate, sodium lactate, sodium bicarbonate, magnesium carbonate, sodium phosphate, potassium phosphate, potassium carbonate and potassium lactate.

4. A method as claimed in claim 1 further comprising the step of adding to the alkaline solution a cation selected from the group consisting of magnesium, zinc, copper, sodium, potassium, calcium and aluminum.

5. A method as claimed in claim 4 wherein the amount of added cation selected from the group consisting of magnesium, zinc, copper, sodium, potassium, calcium and aluminum in the alkaline solution present to secure color and texture retention is from approximately 50 parts per million to 10,000 parts per million, based on the weight of the fresh green vegetable.

6. A method as claimed in claim 4 wherein the cation is magnesium.

7. A method as claimed in claim 1 wherein the vegetable matter is subjected to the alkaline solution by spraying the solution onto the vegetable matter.

8. A method as claimed in claim 1 wherein the fresh green vegetable matter is selected from the group of vegetables consisting of spinach, celery, parsley and peas.

9. A method of preserving the color and texture of fresh green vegetable pasta comprising:
   (a) drying and milling fresh green vegetable matter to produce a vegetable powder;
   (b) subjecting the vegetable powder to an alkaline solution for a period of time and at a temperature sufficient to hydrolyze or partially hydrolyze the methyl and phytyl ester groups of the chlorophyll contained in the green vegetable matter, whereby the methyl and phytyl ester groups of the chlorophyll are converted to the respective alkali salts in an amount sufficient to secure color and texture retention, wherein the pH of the solution is maintained between 9.0 and 11.0 by the addition of sufficient buffer;
   (c) blending the product of step (b) with a mixture comprised of glutinous flour and water, to form a green alimentary vegetable paste wherein the pH of the green alimentary paste is above 7.0 and below 9.0;
   (d) forming a green alimentary vegetable pasta from the green alimentary vegetable paste of step (c); and (e) drying the green alimentary vegetable pasta of step (d), whereby the green color is preserved in the vegetable pasta.

10. A method as claimed in claim 9 wherein the water blended with the glutinous flour and vegetable powder further comprises a cation selected from the group consisting of magnesium, zinc, copper, calcium, and aluminum cations, and a buffer selected from the group consisting of sodium hydroxide and sodium phosphate.

11. A method as claimed in claim 9 wherein the pH of the alkaline solution is between 9 and 11.

12. A method as claimed in claim 10 wherein the cation is magnesium.

13. A method as claimed in claim 9 wherein the buffer in the solution is selected from the group consisting of sodium hydroxide, sodium phosphate, sodium carbonate, disodium phosphate, trisodium phosphate, sodium lactate, sodium bicarbonate, magnesium carbonate, potassium phosphate, potassium carbonate and potassium lactate.

14. A method as claim in claim 10 wherein the concentration of the cation is from approximately 0.0625% to 12.5% based on the dried weight of the vegetable matter.

15. A method as claimed in claim 9 wherein the vegetable matter is shredded before being subjected to the alkaline solution 16. A method as claimed in claim 9 wherein the mixture of step (c) further comprises an extrusion aide selected from the group consisting of glyceryl monosterate.

17. A method as claimed in claim 9 wherein the vegetable matter is subjected to the alkaline solution by dipping the vegetable matter into the solution.

18. A method as claimed in claim 9 wherein the glutinous flour is selected from the group consisting of semolina flour, durum flour and mixtures thereof.

19. A method as claimed in claim 9 wherein the water blended with the glutinous flour and vegetable powder further comprises an alkaline substance.

20. A method as claimed in claim 9 wherein the fresh green vegetable matter is selected from the group of vegetables consisting of spinach, parsley, celery and peas.

21. A method of preserving the color and texture of fresh green vegetable pasta comprising:
(a) subjecting fresh green vegetable matter which has a sodium or potassium content equal to or greater than 100 milligrams per 100 grams of dried fresh green vegetable matter to a buffer solution, wherein the pH of the buffer solution is maintained above 7.0 and wherein the cation of the buffer solution is selected from the group consisting of calcium, magnesium, zinc, potassium, sodium, copper, and aluminum;
(b) preparing a puree of the vegetable matter wherein the pH is maintained between 9.0 and 11.0;
(c) blending a mixture comprised of glutinous flour, the puree of vegetable matter prepared by step (b), and water, to form a green alimentary vegetable paste, wherein the pH of said green alimentary vegetable paste is above 7.0 and below 9.0;
(d) extruding by internal pressure said green alimentary vegetable paste through holes in an extruder die having a plurality of holes, or by sheeting said vegetable paste by pressing it between rollers to produce a green alimentary vegetable pasta; and
(e) drying the extruded or sheeted green alimentary vegetable pasta of step (d), which retains the green color of the vegetable matter.

* * * * *